United States Patent Office 2,794,250
Patented June 4, 1957

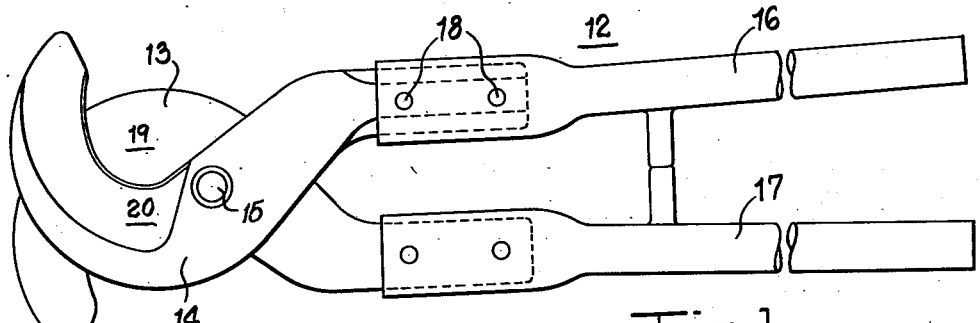
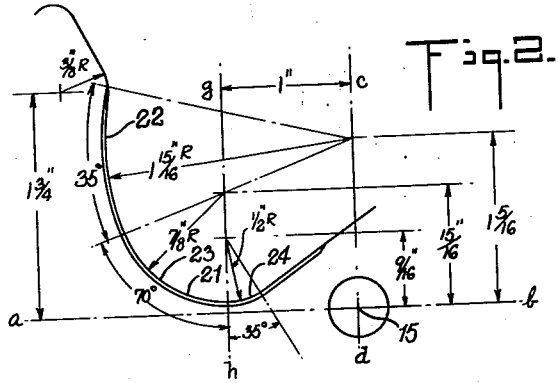
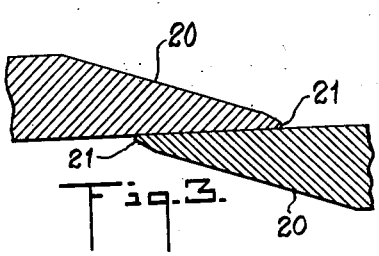
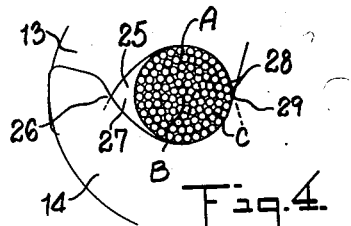
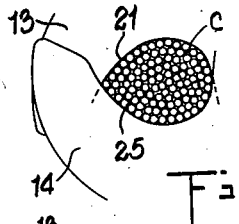
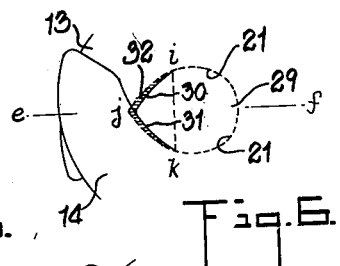
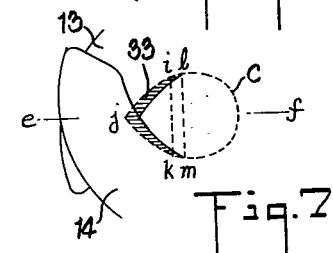
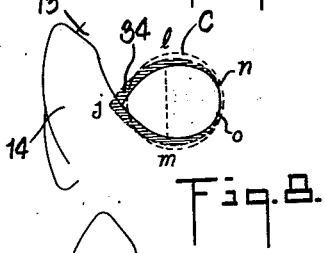
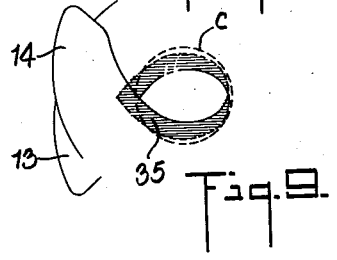
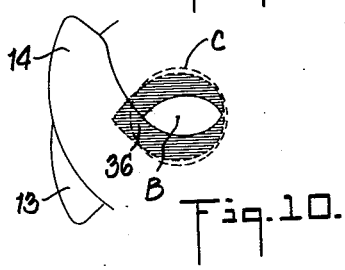
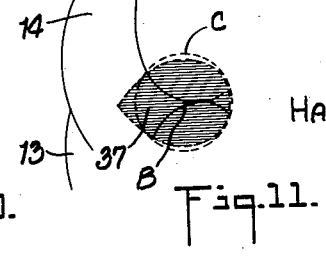
*INVENTOR.*
HARRY RUSSELL BETHUNE
ATTORNEY

2,794,250
CABLE CUTTER

Harry Russell Bethune, Scotch Plains, N. J., assignor to The Thomas & Betts Co., Elizabeth, N. J., a corporation of New Jersey Application May 21, 1953, Serial No. 356,391

6 Claims. (Cl. 30—254)

The invention relates to a cable cutter particularly designed for cutting through cable of the multiple strand type.

In the art of securing the ends of cables, usually circular in cross section, into fittings of different types, it is a requirement that the cut-off ends of the cable be of circular outline in order to fit rather snugly in the cylindrical bores of such fittings. Attempts have been made to provide cable cutters to cut such cables circularly, which cutters have opposing cutting faces semi-circular and designed when the cut is completed to form the cut-off ends dimensioned to fit in the bores of the fittings for which they are intended. Cutting the cable with such form of cutting edges has not proven satisfactory largely because the end of the cable resulting from such cuts was more or less fixedly compressed into an elliptical form in cross section and, in tending to maintain its elliptical form, could not be inserted in the fitting bore as desired. Another objection to cutting stranded cable by any such form of cutting tool was the difficulty of preventing the outer of cutting tool was the difficulty of preventing the outer strands from straying away from the balance of the cable, further rendering it difficult for the cut cable end to be inserted in the fitting bore.

Another difficulty inherent in known practices for cutting off cable ends is that the cables are often of large size and are difficult to cut through simply by manual effort, even when the cutters were formed as long levers to give high mechanical advantage, and this was particularly true when attempts were made to have each cutter engage one-half of the perimeter of the cable as its companion was engaged in cutting the other half of the cable perimeter.

The primary object of the invention is to provide a cutting apparatus for forming an end to a stranded cable which will provide a clean cut in a plane perpendicular to the axis of the cable, without fraying the strands, and which can be formed with a manually operated tool even on a size cable hereto difficult, if not impossible, to sever with manually operated tools, and in which the final circularly cut end is not changed, or at least very slightly changed, from the original cross section of the cable.

Broadly, these objectives are attained by providing a peculiar contour to the opposed cutting edges of a tool of the pliers type to effect a shearing action on the cable and in which at any instant of time only a limited arc length transversely of the cable is being cut and during the next instant of time a likewise limited and continuing arc of the cable perimeter is being cut, beginning at the point most remote from the pivotal connection between the cutting blades of the tool in which during succeeding units of time the shearing is continued progressively to the end nearest the pivotal connection as the cutting edges approach and eventually coincide with each other in a scissor effect at the core center of the cable.

More specifically defined, the method aspect of the present disclosure consists in momentarily deforming the cable to be cut into a heart shape or cordate form in cross section, with the end nearest the pivotal connection of the cutting blades somewhat of oval form and with its opposite end obtusely pointed, momentarily compressing the cable in the plane engaged by the blades into a more or less solid form, and then cutting into the cable so momentarily compressed, starting at the apex end and with the cutting edges moving towards each other with a chiseling action and operating in an arc with the pivotal connection as a center and progressively biting into the cable circularly towards the more oval end as the cutting edges approach the core of the cable.

Various other objects and advantages of the invention will be in part obvious from an inspection of the accompanying drawings and in part will be more fully set forth in the following particular description of one form of cable cutter embodying the invention and of one method of forming the cut, and the invention also consists in certain new and novel features of construction and combination of parts hereinafter set forth and claimed.

In the drawings—

Fig. 1 is a view in side elevation of a cable cutting tool with the blades in a fully closed position and illustrating a preferred embodiment of the tool aspect of the disclosure and showing an apparatus by means of which the method aspects of the invention may be practiced;

Fig. 2 is a plan view of the cutter end of either of the blades of Fig. 1;

Fig. 3 is a detail of the cutting edges shown in section and with their flat sides overlapping when the blades are closed;

Figs. 4–11 are explanatory views of the cutter blades shown in the preceding figures in their several successive closing operative positions acting upon the cable being cut, with the uncut portion of the cable shown in blank in cross section;

Fig. 4 shows the blades simply closed lightly on the cable prior to any deformation or cutting of the cable;

Fig. 5 shows the next position with the blades deforming the cable under load sufficient to give the cable the desired heart-shaped form and filling the space between the cutting edges herein featured;

Fig. 6 shows the blades in their initial position cutting into the pointed end of the deformed cable, and in this and in the succeeding figures the part cut is shown in section with the strands of the uncut portion omitted to avoid confusion;

Fig. 7 shows the relation of the blades in what may be called the second or next definitely defined period in the cutting operation;

Figs. 8–10 are similar views of the relation of the blades in three succeeding periods, Fig. 9 showing the beginning of the cut at the right end, and Fig. 10 showing the entire perimeter being cut slightly; and Fig. 11 shows the blades about to overlap each other at the core of the cable and the cut complete.

In the drawings and referring first to Fig. 1, there is disclosed a tool 12 including two blades 13 and 14 pivotally connected at a fulcrum 15. For convenience of identification, the blade 13 will be identified as the upper blade and the blade 14 as the lower blade. The blades are formed as replaceable parts to facilitate sharpening and replacing when damaged, and are secured to a pair of long handles 16, 17 by rivets 18. The cutting blades are formed of steel with a hardness Rockwell "C 56–58," and are drop-forged and carefully honed to provide in each case a flat side 19 fitting snugly against its companion, and a long, outer beveled side 20, with the two sides intersecting to form a double-beveled cutting edge 21, as shown in Fig. 3. The two blades are identical and are each provided with its concave cutting edge 21 disposed in opposing relation to cut a stranded cable A located therebetween after the blades are partly closed on the cable, as indicated in Fig. 4.

The particular feature of novelty in this disclosure is the non-circular, non-elliptical contour, when viewed in side elevation, of the concave cutting edge 21. In general, it forms a continuous curve formed of a set of progressively longer arcs of circles of progressively greater diameter, with the arc of least diameter nearest the fulcrum. Differently defined, the two opposing cutting edges when in the partially closed positions shown in Figs. 4 to 8, inclusive, and until the more definite sharp end elliptical form of Figs. 9 and 10 begins to show, form therebetween the loop or tear-drop portion of a cycloid where the generating point lies outside of the circle, by some authorities called a curtate cycloid.

The cutting edge of each blade will be hereinafter sometimes referred to broadly as approximately one-half of the loop portion of a prolate cycloid, and by this is meant the one side of the closed loop which depends from each cusp of the larger curves of a curtate cycloid type.

The specific physical article from which these drawings were made had its cutting edge 21 formed approximately that of the half of the loop of a curtate cycloid, but was actually composed of three arcs of circles of different arc lengths, of different diameters, and with differently located centers, as indicated in Fig. 2 to form as close as possible the desired curve. In Fig. 2 a base line a—b bisects the angle between the handles, is practically tangent to the cutting edge 21, and passes through the fulcrum 15. A perpendicular c—d is normal to the line a—b at the fulcrum.

The longest arc 22 which forms the outer part of the cutting edge 21 at the free end of the blade has a radius of one and fifteen-sixteenths of an inch and an arc length of about thirty-five degrees, with its center on the perpendicular c—d about one and five-sixteenths of an inch from the line a—b.

The next arc 23, forming the intermediate arc, has an arc length of about seventy degrees, a radius of seven-eighths of an inch, and with its center on a line g—h parallel to and inset one inch from the perpendicular c—d. The shortest arc 24 nearest the fulcrum 15 has a radius of one-half inch and has its center in the last-named parallel line g—h and has an arc length of about thirty-five degrees. While the cutting surface is thus formed of three arcs, nevertheless the surface is a continuous curve and visually gives no evidence of any break in continuity between the circular arcs. In this application the term "one-half of a loop of a curtate cycloid" is intended to cover any non-circular and non-elliptical form of curve with one end pointed and the other end sharply curved similar to that shown and capable of performing the function hereinafter described for the instant illustrated form of curved cutting edge.

The ends of the blades beyond the curve 22, 23, 24 herein featured are straight, are each lapped by the other blade, and thus are not involved in the cutting operation.

The cable A is of the stranded type circular in all cross sections, having a core B, and is formed of a multitude of somewhat spaced-apart strands C and in which the lay of the strands is twisted as is usual in such cables. In order to illustrate the use of the invention with a large size cable it may be assumed that the cable in Fig. 4 is of 750,000 circular mils, and is formed of aluminum. The device illustrated is not limited to only one size of cable, as the blades may be opened from the position shown in Fig. 4 to receive a cable of a somewhat larger size, and may be closed from the position shown to accommodate a somewhat smaller size of cable.

In operation the cable is located between the two opposed cutting edges 21 and the blades closed lightly thereon as shown in Fig. 4. The opening 25 so formed between the cutting edges is initially somewhat heart-shaped or, perhaps more accurately, egg-shaped in cross section with one end pointed rather than round, with the pointed apex 26 near the free ends of the blades and thus remote from the fulcrum 15. Vacant spaces such as the triangular space 27 are formed at the apex of the opening and quite likely open cracks 28 are apt to be present at the rounded, oval-like end 29 of the opening 25.

With the cable so located in position the handles are firmly but not too forcefully moved towards each other. This has the result of slightly reducing the cross-sectional area of the opening 25, causing the cable to be deformed to take the heart-shape of the space 25 as indicated in Fig. 5. For the most part this means that the strands forming the left side of the cable as viewed in Fig. 4 move to the left to fill up the apex end of the opening and apparently somewhat distending the initial interstices between the strands at the apex end 26 of the showing. The strands forming the right side of the cable move to the right to take up any clearances 28 which may be present at the more or less rounded or oval end 29. This compressing of the cable in the plane engaged by the blades continues until the resulting more or less compacted cable begins to offer resistance to the continued squeeze of the approaching edges 21.

As the edges move inwardly towards the position shown in Fig. 6 two transversely spaced-apart cuts appear at about the points 30 and 31 on opposite sides of the cutting axis e—f which passes through the fulcrum 15 and the point at which the cutting edges intersect in all the operative positions of the blades. At this time the cutting is along an arc whose center is at 15 and which passes through the points 30 and 31, but does not pass through the core B of the cable. The initial cuts at 30, 31 quickly merge one into the other across the axis e—f and take the form indicated by the relatively thin cross-hatching at 32. It is noted that at this instant of time there is only a limited arc i—j—k of the cable perimeter being cut and the balance of the perimeter is not being cut at this instant. In other words, at this instant practically the entire available manual force is being utilized to cut a limited extent of the cable perimeter of the arc length i—j—k.

Continuing the approach of the blades for a further overlapping of their free ends during the next unit of time, the initial cut 32 of Fig. 6 is further extended outwardly on each side of the line e—f to extend the arc i—j—k and to deepen the cut slightly as shown by the cross-hatching in the arc l—j—m in Fig. 7. In other words, during the time interval between the Fig. 6 and the Fig. 7 steps the cut has increased at the perimeter by the distance i—l on the upper side and k—m on the lower side and slightly deeper, and still no cutting is had at the right side of the cable.

With a still further approach of the blades to about the position shown in Fig. 8, the spread of the cut, as indicated by the longer and slightly deeper hatching 34, has extended almost but not quite to the right side of the cable, so that at this instant the total cut forms the arc j—n on the upper side and forms the arc j—o on the lower side of Fig. 8. In other words, during this interval the arc of the perimeter cut on each side has increased on the upper side by the tincrement l—n and on the lower side by the increment m—o.

At about this point in the cutting operation it has been noted that, the cable having been released from the deforming squeeze action of the blades, as indicated in Figs. 5-7, begins to spring back slowly towards its initial circular contour and that by the end of the cutting operation the cable has completely, or at least almost, reverted to its circular form indicated by the dotted circle C in the following figures.

Continuing the approach of the blades, it is seen from Fig. 9 that the cut is beginning to take place with relatively slight penetration at the right side of the cable and with an increase in depth to form the cut as indicated by the heart-shaped hatching 35.

At about this time the cross section of the uncut portion of the cable begins to lose its previous heart-shaped outline, particularly at its right end, and tends to assume the shape of a fat ellipse in cross section with somewhat pointed ends along the axis e—f.

With still further approach of the blades the cutting edges are well within the entire perimeter of the cable so that the cut 36 as shown in Fig. 10 is for the most part of substantial uniform thickness sharply reducing in thickness towards the right end. It is noted that the perimeter of the uncut portion of the cable is becoming progressively less and less as the core B is being approached and accordingly less and less manual squeeze force on the handles is necessary to cut through the cable during the final cutting operation.

The cutting action is continued until the blades meet at the core B as shown in Fig. 11, at which point the cut is complete. The contour of the total area cut is indicated by the heart-shaped hatching at 37, but as the contour is consantly changing following its release from the tool, the area becomes more nearly the circular form shown by the dotted circle C at the conclusion of the cut. The cut-off end is discarded and the balance of the cable has returned, or at least almost returned, to its initial dotted circle position. If still deformed in any way a hand squeezing of the cut-off end brings it to the desired circle, ready to be inserted in the fitting for which it is intended.

It is particularly noted that after the blades have engaged the cable as in Fig. 4, any subsequent cutting action of the blades cannot force the cable out of its position while being severed, as would be the case with a scissors.

The operation above described with equal and corresponding short lengths of cuts both above and below the axis e—f takes place when the cutting edges of the two blades have about equal degrees of sharpness. In those cases where one of the edges is sharper than the other the cuts will, of course, be made faster by the sharper blade and in this case the line e—f will be curved away from the sharper blade and with the blades meeting at a point slightly offset from the core B. However, the end result is the same as above indicated.

It is noted that all of the lines of squeeze pressure on the cable, including the cutting lines, are all directed inwardly of the cable though not necessarily towards the core B, and thus the strands are maintained in closed relation and are restrained from becoming loose.

The operation has been described in connection with a bare cable, but it is understood that the operation is substantially as described in the event the cable is of the insulated jacketed type, except that the cutting through the insulation, especially if of the rubber-like type, is more easily attained and thus with less squeeze force than is required subsequently to cut through the metal strands.

In any case there is attained a clear severing of the cable in a plane perpendicular to its axis; with no permanent deformation of the cut-off end from its initial circular form and with no loose strands, and this has been attained by manual pressure applied to the handles of a tool—a relatively short tool in the instant case, about twenty-four inches long and operating on a cable such as the cable A and which has heretofore not been cut by manual force.

I claim:

1. A cutting tool for severing circular electric cables of the multi-strand type without substantial final deformation, comprising a pair of pivotally connected blades having identical concave cutting edges in opposing relation and forming therebetween when the free end portions of said blades are disposed in partial overlapping relation, an opening substantially defining a curtate cycloid in outline with its apex closely adjacent the free ends of said blades and the diametrically opposite circular portion of said curtate cycloid adjacent said fulcrum, said opening becoming progressively narrower at its apex more rapidly than at its opposite circular portion as said blades are moved to completely overlapped position.

2. A cutting tool for severing circular electric power cables of the multi-strand type without final substantial cross-sectional deformation, comprising a pair of pivotally connected blades having identical concave cutting edges in opposing relation, a fulcrum forming the pivotal connection therebetween, each of said cutting edges defining a continuous curve comprising three arcs of circles of different diameters and of different lengths merging longitudinally and without interruption into the next in order, the arc of least length and diameter being nearest said fulcrum, the intermediate arc being longer and with a diameter greater than that of said first-named arc, and the third arc farthest from said fulcrum being longer and with a larger diameter than that of the intermediate arc.

3. A cable severing tool including a pair of pivotally connected jaws having identical opposing concave cutting edges and a fulcrum forming the pivotal connection; each of said cutting edges defining in outline one-half of the loop of a curtate cycloid and coacting to form therebetween, when said jaws are in a relatively full open position with their free end portions in partial overlapping relation, a heart-shaped opening defining in outline the loops of a curtate cycloid with the apex of said opening at the end thereof remote from said fulcrum, the heart-shaped configuration of said opening changing to a form substantially elliptical as said jaws approach a more fully closed position, the cutting edges of said jaws overlapping initially in the region of their free ends and finally totally overlapping each other at the heel thereof adjacent said fulcrum upon movement of said jaws to closed position.

4. A cable cutting tool including a pair of pivotally connected blades having identical opposing concave cutting edges, a fulcrum forming the pivotal connection, each of said cutting edges forming a continuous curve defining in outline one-half of the loop of a curtate cycloid in the form of three arcs of circles in the following proportions, the free end portion of each blade defining the arc furthest from said fulcrum having a length of thirty-five degrees and a radius of one and fifteen-sixteenths of an inch, the next adjacent arc having a length of seventy degrees and a radius of seven-eighths of an inch, and the next adjacent arc nearest to said fulcrum having a length of thirty-five degrees and a radius of one-half an inch.

5. A cable cutting tool including a pair of blades having a fulcrum forming a pivotal connection therebetween, said blades presenting identical opposing concave cutting edges in the form of a longitudinal continuous curve approximating one-half of the tear-drop loop of a curtate cycloid, said blades in one relative position forming therebetween a complete tear-drop loop of a curtate cycloid, the longitudinal curve of each blade having its largest radius in its free end portion and forming the apex of a curtate cycloid therebetween when said blades are disposed in partially overlapping relation.

6. A cutting tool having a fulcrum and identical opposing concave cutting edges adapted to receive therebetween an article of circular cross-section for initially deforming the circular cross-section of the article as the free end portions of said cutting edges are caused to initially overlap each other and to subsequently cut through the perimeter of said article along oppositely extending arcuate paths perpendicular to and intersecting the axial center of said article as said cutting edges continue to overlap each other progressively in their movement to closed position, each of said cutting edges being in the form of a longitudinal curve approximating that of one-half of the tear-drop loop of a curtate cycloid having its largest radius in the portion thereof remote from said fulcrum.

References Cited in the file of this patent

UNITED STATES PATENTS

| | | |
|---|---|---|
| 580,563 | Totten | Apr. 13, 1897 |
| 725,546 | De Celle | Apr. 14, 1903 |
| 1,610,015 | Kozma | Dec. 7, 1926 |
| 1,952,930 | Lurcott | Mar. 27, 1934 |

FOREIGN PATENTS

| | | |
|---|---|---|
| 117,007 | Sweden | Aug. 13, 1946 |